United States Patent [19]
Chamberlain et al.

[11] Patent Number: 5,537,623
[45] Date of Patent: Jul. 16, 1996

[54] MULTIPLE GROUP ADDRESS RECOGNITION

[75] Inventors: Dale R. Chamberlain; Joseph K. Lee, both of Raleigh; David W. Lowther, Cary; Gregory A. Mirek, Raleigh; Vernon R. Norman, Cary, all of N.C.; Lee A. Sendelbach, Rochester, Minn.; Scott Tippens, Powder Springs, Ga.; Anthony D. Walker, Durham, N.C.

[73] Assignee: International Business Machines Corporation, Armonk, N.Y.

[21] Appl. No.: 24,593

[22] Filed: Mar. 1, 1993

[51] Int. Cl.⁶ .................................................. G06F 12/00
[52] U.S. Cl. ................... 395/800; 395/200.21; 395/435; 364/DIG. 1; 364/246.3; 364/247.5; 364/242.94
[58] Field of Search ..................... 395/425, 800, 395/200, 400, 725, 275, 820, 200.21, 435; 370/85.13–85.16

[56] References Cited

U.S. PATENT DOCUMENTS

| | | | |
|---|---|---|---|
| 4,739,510 | 4/1988 | Jeffers et al. | 380/15 |
| 4,866,421 | 9/1989 | Szczepanek | 370/85.15 |
| 5,095,480 | 3/1992 | Fenner | 370/94.1 |
| 5,136,580 | 8/1992 | Videlock et al. | 370/60 |
| 5,200,953 | 9/1993 | Spatafore et al. | 370/85.14 |
| 5,235,595 | 8/1993 | O'Dowd | 370/60 |
| 5,245,606 | 9/1993 | DeSouza | 370/85.13 |
| 5,317,708 | 5/1994 | Edgar | 395/425 |
| 5,386,566 | 1/1995 | Hamanaka et al. | 395/700 |

Primary Examiner—Mehmet B. Geckil
Attorney, Agent, or Firm—Joscelyn G. Cockburn

[57] ABSTRACT

A network interface card for attaching computers, work stations or the like to a Local Area Network (LAN) includes a device which indicates an address compare if selected bits in a first part of an address, in the address field of a received frame, matches bits stored in the network interface card and at least one bit of a code word stored at a particular address of an index RAM is set to a predetermined state. The particular address in the index RAM is identified by a second part of the address in the received frame. The range of address which can be recognized is further extended by a contents addressable memory (CAM) coupled to the device. The CAM makes a parallel compare between an input address and its contents and outputs a match signal if a match is found. A programmable control register is used to activate or deactivate the CAM or the device.

16 Claims, 9 Drawing Sheets

GROUP ADDRESSES IN CAM

| E2 AB 8C 86 EF FE |
|---|
| E2 AB 8C 86 E0 04 |
| E2 AB 8C 86 E0 06 |
| E2 AB 8C 5E F0 07 |
| E2 AB 8C 34 F0 07 |
| E2 AB 8C 86 FF FA |

CAM BASE ADDRESS TABLE

| E2 | AB | 8C | 34 | F | 0 | 02 |
|---|---|---|---|---|---|---|
| E2 | AB | 8C | 5E | F | 0 | 01 |
| E2 | AB | 8C | 86 | E | 0 | 03 |

BASE ADDRESS — BASE GROUP COUNT

FIG. 7

RAM BASE ADDRESS TABLE

| | | | | | | | |
|---|---|---|---|---|---|---|---|
| (A) | E2 | AB | 8C | 34 | F | 0 | 02 |
| (B) | E2 | AB | 8C | 5E | F | 0 | 01 |
| (C) | E2 | AB | 8C | 86 | E | 0 | 03 |

BASE ADDRESS — BASE GROUP COUNT

Column (A): FFA=1, 7=1
Column (B): 7=1
Column (C): FFE=1, 6=1, 4=1

MULTIPLE GROUP ADDRESS RECOGNITION

BACKGROUND OF THE INVENTION

1. Field of the Invention

The present invention relates to devices for interfacing data terminal equipment (DTE) to communications networks in general and more particularly to circuit arrangements which improve the speed and number of addresses which are processed at the DTE in order to determine whether or not a frame on the network reaches its destination.

2. Prior Art

The use of local area networks (LANs) for interconnecting DTEs, such as computers, word processors or the like, is well-known. The conventional LAN includes a transmission media interconnecting a plurality of DTEs. A network interface card, also known as an adapter, is mounted in each one of the DTEs and couples each one of the DTEs to the transmission media. The adapter performs the functions which are necessary for the DTEs, also called stations, to exchange messages.

The adapter package each message in a frame which is transmitted onto the transmission media. Each frame includes a destination address in which the identity of the recipient station is inserted. Among the many functions which the adapter performs is the Address Recognition Function (ARF). The adapter uses the ARF to determine if the frame reaches its destination. The simplest implementation of the ARF is as follows: the adapter is provided with circuitry which compares an incoming destination address with its own or assigned address. If the address matches, the frame is copied. If the addresses do not match, the frame is not copied. The ARF is usually implemented as part of a VLSI chip. Due to the large number of functions which are implemented on the chip, space (surface area) is at a premium. As a result, the allotted surface area makes it possible to implement circuitry for recognizing only a limited number (usually two) of relatively short (three bytes or less) addresses. In the alternative, appropriating more of the chip space for implementing the ARF results in less surface area on which needed functions can be implemented.

U.S. Pat. No. 4,866,421 discloses an adapter with circuitry for limited address recognition. The limited address recognition is done in the protocol handler of a VLSI chip. In addition, external circuities are used to provide extended address recognition. Even though the patent provides improvement in the right direction, it falls short of meeting the needs of present and future LAN requirements because it does not provide for multiple group address recognitions. In addition, it does not provide address recognition for extended addresses. In general, an extended address means an address having more than thirty-two (32) bits.

SUMMARY OF THE INVENTION

It is, therefore, the main object of the present invention to provide a more efficient ARF than has heretofore been possible.

It is another object of the present invention to provide an ARF for multiple group address recognition.

It is still another object of the present invention to provide an ARF for extended addresses.

The improved ARF is able to recognize multiple group addresses with extended addresses of at least forty-eight (48) bits.

The ARF is generated by a generator which includes a programmed microprocessor and a circuit arrangement. The circuit arrangement includes a plurality of registers, preferably fabricated in a VLSI chip, with each one of the registers storing one of a plurality of group addresses. An interface circuitry couples the plurality of registers to an external Index RAM and a Content Addressable Memory (CAM) module. The address recognition can be performed simultaneously in the CAM and registers/Index RAM combination or sequentially. For sequential operation, either the CAM or the registers/Index RAM combination is selected. The selection is made by setting selected bits in a control register of the ARF logic.

If the registers/Index RAM combination is selected, an address match occurs when the address stored in one of the registers matches a first part of the received address and a predetermined bit, in the Index RAM at an address selected by the second part of the received address, is set to a first state. Stated mathematically, a match occurs if (S) $DA_n$ (0:35)=R DA (0:35) and external DA bit="1", at selected locations of the Index RAM; where $n=0, 1, 2 \ldots$ (S) DA represents destination address stored in compare registers, (R) DA represents destination address in a receive message, DA represents destination address, 0:35 represents bits 0 through 35.

If the CAM is selected, the comparison is done internally and a match or no-match signal is outputted.

The foregoing and other features and advantages of the invention will be more fully described in the accompanying drawings.

DESCRIPTION OF THE PREFERRED EMBODIMENT

The present invention may be used to identify items which are members of a particular universe of items. It works well, in a token ring communications network, in determining addresses which are members of multiple group addresses (hereafter called multiple group address recognition) and, as such, will be described in that environment. However, this should not be construed as a limitation upon the scope of the invention since it is well within the skill of one skilled in the art to apply the invention to other environments without departing from the scope and/or spirit of the present invention.

Figure 1:
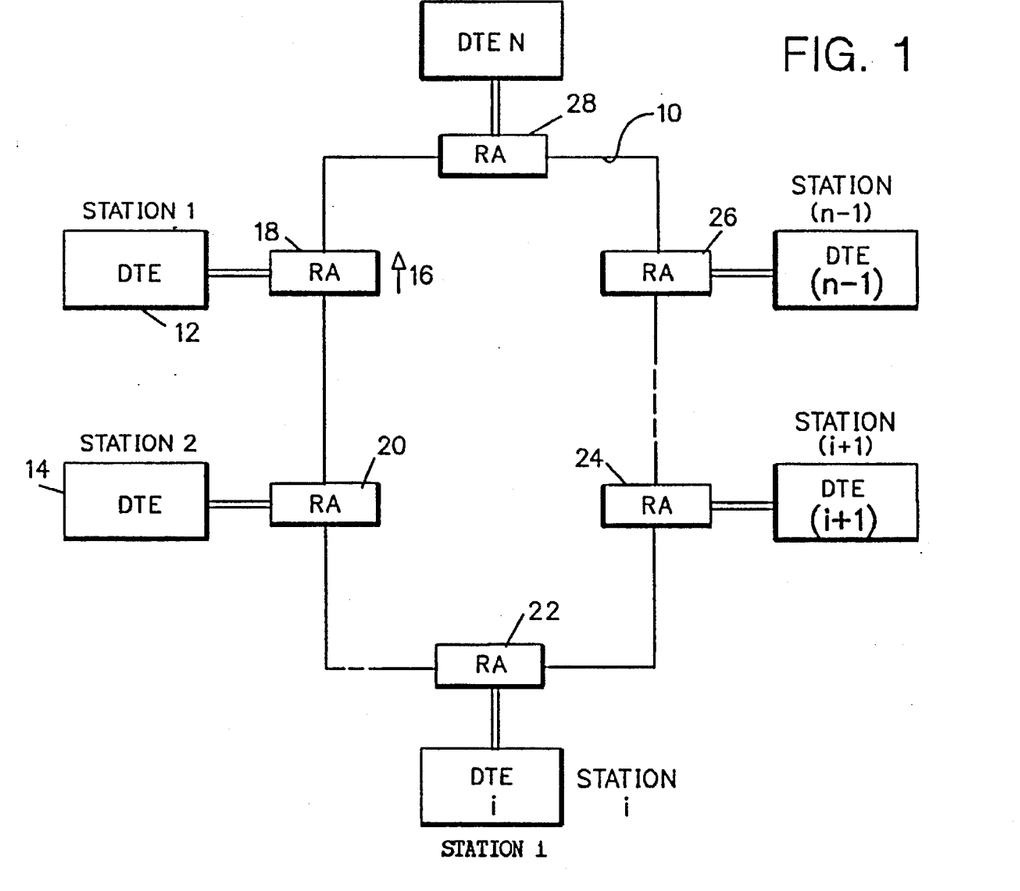
FIG. 1 is a block diagram of a communications network in which the present invention may be used.

FIG. 1 shows a serial loop communications system in which the present invention (to be described hereinafter) may be used. The serial ring communications system includes a closed unidirectional transmission media identified by numeral 10. The closed loop unidirectional transmission media interconnects a plurality of data terminal equipment (DTE) or data terminal units (DTU) 12, 14 ... i, i+1, ... n−1 and N. Each data terminal unit may include one or more devices such as display terminals, microcomputers, data collectors, word processing units telephone-type apparatus, etc. The function of the system is to exchange or distribute data between these devices. Data transmission in the system is unidirectional and may be in the direction shown by arrow 16. The data terminal equipment is connected to the ring by ring adapter (RA) 18, 20, 22, 24, 26 and 28 respectively. The structure and function of the ring adapters are identical; therefore, the description of one adapter is intended to cover all the adapters. The purpose of the ring adapter is to receive data from and transmit data onto the ring. To this end, the ring adapter performs ring protocol functions which enable the free movement of data on the ring without impacting the design of the data terminal equipment.

Still referring to FIG. 1, each data terminal equipment is connected to the ring through a ring adapter. As stated previously, data to and from the data terminal equipment is presented and extracted from the ring by the ring adapter. Incorporated in the ring adapter is the address recognition function (ARF) of the present invention. Details of the ARF will be given hereafter. Suffice it to say at this time that the ARF stores a relatively large number of addresses and whenever an address is received from the loop, the ARF correlates the received address with the universe of stored address and outputs a signal when a match occurs.

Still referring to FIG. 1, the ring adapter and its connected data terminal equipment are hereinafter referred to as a station. For example, station 1 includes data terminal 12 and ring attachment or adapter 18. Likewise, station 2 includes data terminal equipment 14 and ring adapter 20, and so forth. Even though the ring adapter is shown as a separate unit from the data terminal equipment in FIG. 1, in reality, the adapter usually plugs into an expansion slot in the housing of the DTE which it connects to the ring. For example, the IBM® token ring network PC adapter card plugs into an IBM PC expansion slot and connects the PC to the communications media.

Figure 3:
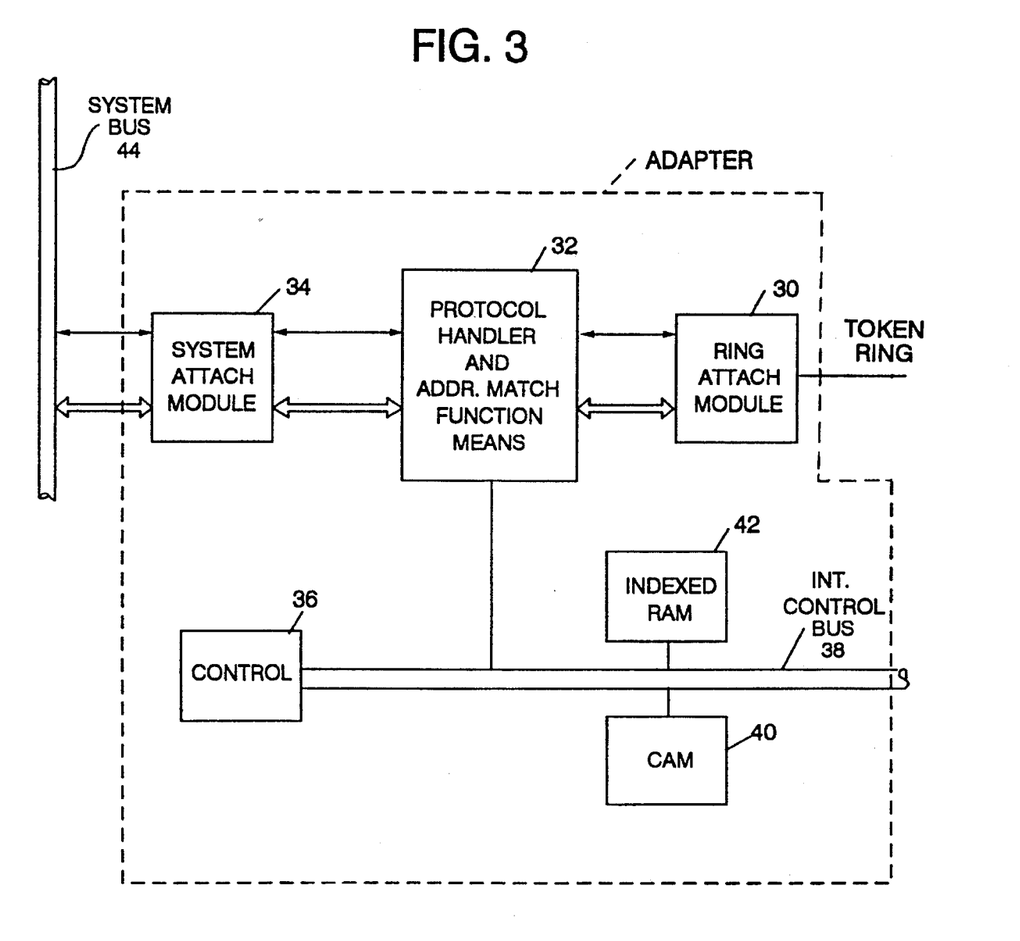
FIG. 3 is a functional block diagram of an adapter embodying the teachings of the present invention.

FIG. 3 shows a block diagram of an adapter which embodies the teachings of the present invention. The adapter includes a ring attach module 30, a protocol handler and address match function means 32, a system attach module 34, a controller (control) 36 with a controller bus (INT. CTRL BUS) 38 to which contents address memory (CAM) 40 and Index RAM 42 are connected. In the preferred embodiment of the invention, the controller is a programmed microprocessor and the INT. CTRL BUS 38 is the microprocessor bus.

Still referring to FIG. 3, the ring attachment module 30 is connected to the protocol handler and address match function means 32 and interconnects the adapter to the token ring. Likewise, the system attachment module 34 is connected to the protocol handler and address match function means 32 and interconnects the adapter to the system bus of the device (not shown) in which the adapter is mounted. The ring attachment module 30 is a grouping of conventional electronic circuits which perform, among other things, electrical signal conversion, etc. on data which is slated for transmission on the ring and on data which is received from the ring. The ring attachment module, sometimes called front end module, performs such functions as signal conversion including modulation and demodulation. The front end module 30 also includes the phase lock loop which extracts the clocking signal from Manchester encoded data received from the ring. The recovery clock is used for reclocking data through the adapter to the native device system bus or I/O channel 44. The recovery clock is also used for reclocking data for retransmission onto the ring.

The protocol handler 32, is connected to the internal bus 38 and provides bit and byte level functions. These functions include encoding and decoding data, handling token protocols according to the IEEE 802.5 and 802.2 Standards, generating and detecting delimiters, generating and checking cyclic redundancy check (CRC), decoding addresses, etc. The address match function means, shown as part of the protocol handler 32, embodies the teachings of the present invention, details of which will be given hereinafter.

The system attach module 34 includes a plurality of conventional circuities which process data received from the protocol handler to conform to a format consistent with the device in which the adapter is mounted and process data received from the device to conform to a format suitable for the protocol handler. The microprocessor device 36 is the controller for the adapter. To this end, it includes a RAM (not shown) and a ROM (not shown) which carry stored programs for controlling the microprocessor. The Index RAM 42 and CAM 40 are elements of the address match function means, details of which will be given subsequently.

Figure 2:
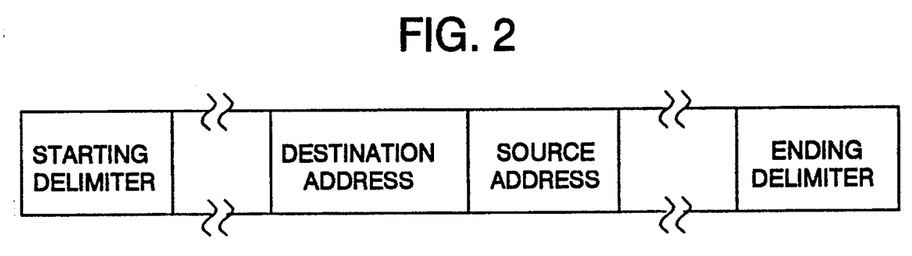
FIG. 2 is a schematic of a typical LAN frame.

Turning to FIG. 2 for a moment, a typical LAN frame is shown. In general, data transmitted and received in the LAN environment is constructed as a "packet". The "packet" is also known as a frame and is composed of several parts or "fields". For purposes of discussion, only those fields of the packet that are of interest to the present invention will be discussed. The fields of interest include starting delimiter, destination address, source address, and ending delimiter. The starting delimiter indicates the start of the frame. The destination address indicates the data terminal equipment to which the frame is forwarded. The source address identifies the data terminal equipment from which the frame is sent. The ending delimiter indicates the end of the frame. The address recognition function (details to be given hereinafter) correlates the address in the destination address field and makes a determination whether or not the address matches one stored in the adapter.

Figure 4:
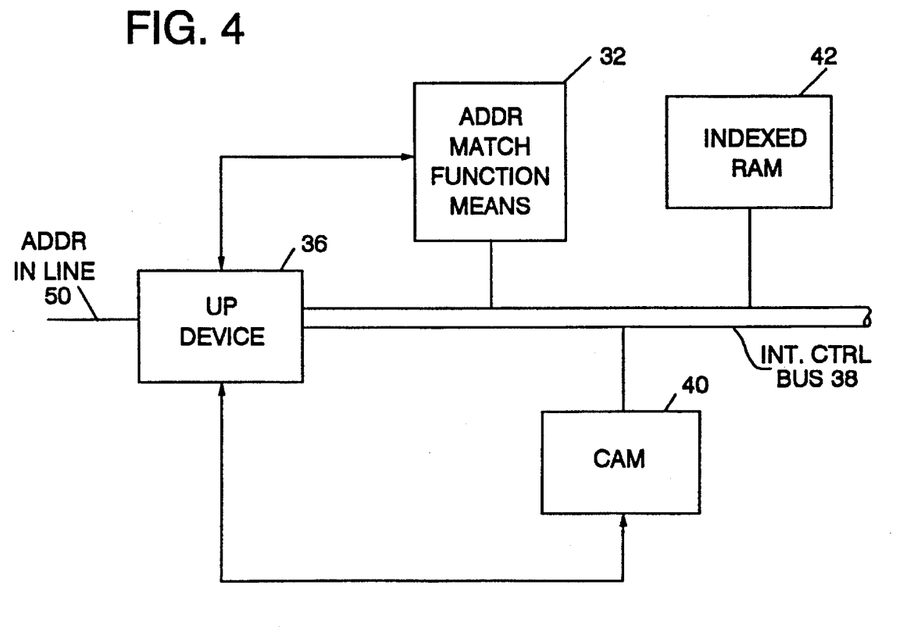
FIG. 4 is a functional block diagram of the ARF (Address Recognition Function).

FIG. 4 is a functional block diagram of the address recognition function device. For simplicity, common numerals are used to identify components previously discussed. The address recognition function device includes the address match function means 32, the index RAM 42, CAM 40 and microprocessor device 36. The named components are coupled to microprocessor bus 38. In addition, CAM 40 is connected over simplex line 46 to microprocessor device 36. Similarly, address match function means 32 is connected over simplex line 48 to microprocessor device 36. Addresses from the destination address field of a frame are fed over address in line (ADDR IN LINE) 50 to microprocessor device 36. The address match function means 32 includes a plurality of registers for storing selected addresses and combinatorial/logic circuitry which compares an address on microprocessor bus 38 with addresses in the registers and outputs part of the required signal for indicating a match. The other part of the signal for indicating a match is obtained from information in the Index RAM 42.

Similarly, CAM 40 is an off-the-shelf module which is able to store a plurality of addresses. It accepts an address from microprocessor bus 38, compares it against the stored addresses and, when a match occurs, outputs a signal on line 46 to the microprocessor device 36. Functionally, the CAM is basically a large comparator. A common implementation is a 256×48 bit array. This means that 256 independent addresses, each one comprised of 48 address bits, can be stored in the CAM. When an address such as the DA address from a typical LAN frame is presented to the CAM, the CAM compares the 48 bit address with the 256 stored addresses and outputs a signal when a match occurs. Among the off-the-shelf CAM devices which are available for use in the present invention is the Am99C10A module manufactured and sold by Advance Micro Device (AMD). As stated above, the microprocessor device 36 includes a microprocessor, a ROM and a RAM. The microprocessor assigns several control registers (to be described hereinafter) which are used for controlling the operation of the address recognition function device. By setting appropriate bits in the control registers, the CAM or the Registers/Index RAM combination can be selected separately or sequentially to determine an address match.

Figure 5:
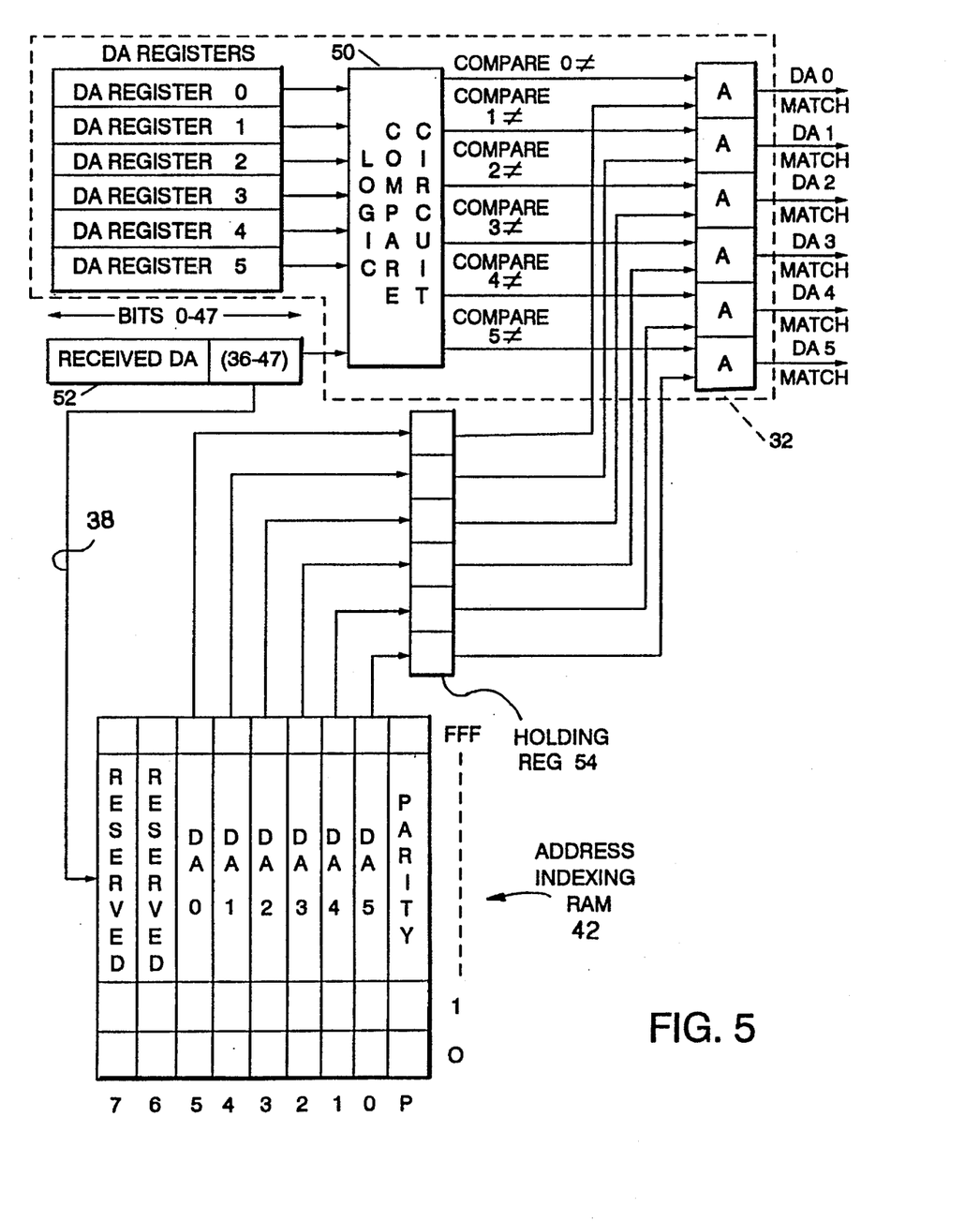
FIG. 5 is a circuit diagram of the ARF.

FIG. 5 is a circuit diagram of the Address Recognition Function device. For simplicity, the CAM is not shown and only control registers (52, 54) from the microprocessor device 36 are shown. The address match function means 32 includes a plurality of registers interconnected by separate output to compare logic circuit means 50. The outputs from compare logic circuit means 50 are fed over individual compare lines to one input of a logical AND gate. Each of the registers stores a base address portion of an address. The base address portions are compared, by compare logic circuit means 50, with a base portion of an address stored in microprocessor control register 52. If a match occurs, the compare logic circuit means outputs a signal indicating a match on one of the lines labelled compare 0, compare 1 and so forth. The compare logic circuit means 50 is a standard off-the-shelf comparator fabricated from a plurality of Exclusive OR blocks and AND logic circuit. The compare function of the standard compare logic circuit means 50 is well-known in the art, therefore, further description of the comparator will not be given. It is worthwhile noting if the address of registers 0 and the bits labelled "Received DA" in control register 52 matches, the comparator activates the line labeled compare 0, the signal indicating a match for register 1 and the bits labeled "Received DA" in the base portion of control register 52 is outputted on the line labeled compare 1 and so forth.

Still referring to FIG. 5, in the preferred embodiment of the invention, the index RAM is a 4K×9 RAM. The RAM is connected over microprocessor bus 38 to the microprocessor. The number of bits in the microprocessor control register 52 which is not used as part of the base address, is used for accessing the RAM. As a result a plurality of addresses could be selected in the RAM, each one different depending on the last section of the received address. Because of the indexing characteristic of the procedure, the RAM is termed an "Index RAM". In one embodiment of this invention, the RAM is nine bits wide with addresses Hex(0) through Hex(FFF). Bits 7 and 6 are reserved, bits 0–5 store the DA registers and bit P stores the parity. The output from the RAM is fed over the respective lines to selected position in holding register 54. The holding register 54 is one of the control registers in the microprocessor. The holding reg. 54 has a bit position for storing a bit representative of the state of the bit, in the Index RAM, associated with the address used to access the Index RAM. For example, if the bit in a selected address of the Index RAM is a logical "1", the corresponding position in the holding Reg 54 is set to a logical "1".

As described previously, the compare result generated from a match between the contents of one of the internal base registers and a portion of the received address provides only part of the requirement for indicating a match between the received address and one of the plurality of addresses stored in the adapter. The final qualification for a match is based on the result obtained from the external 4K×9 RAM (FIG. 5). Both results (that is, from the comparator and one stage of the holding register 54) are fed into respective AND gates and the output from the selected AND gate identifies the match. The RAM includes a plurality of addresses labeled 0 through FFF and a plurality of sections labeled P through 7. Each of the vertical sections 7 and 6 marked reserved are not used in the present implementation. The section labeled DA0 through DA5 correspond to each of the internal DA registers with similar numerals. P indicates the parity for each address.

As stated previously, the destination address received from the ring is stored in control register 52. A portion of the address labeled "RECEIVED DA" (FIG. 5) is compared with information in the DA register and provides the first part of the requirement for indicating a match. The remaining bits of the received address provide an address or index to the RAM over index bus 38. The columns of the RAM labeled DA0, DA1 and so forth indicate that bits retrieved from those positions are used to qualify their respective internal DA address match results. In the preferred embodiment of this invention, the base address is comprised of 36 bits, while the index to the RAM is the last 12 bits of the address.

An example of how the system works will now be given. Assume the address coming in is a 48 bit address. If the first 36 bits of the incoming DA field match the address stored in DA register 2 (FIG. 5), this would provide part of the requirement for indicating a match. That part would be outputted on the line labeled Compare 2 from the compare logic circuit means 50. The final 12 bit would then be routed over bus 38 as an address to the external index RAM. Let us assume this address has a value of "100" X (hexadecimal). A RAM read is initiated to retrieve all of the DA bits from this location. It should be noted that the bits are appropriately stored when the system is set up as to the range of addresses which should be recognized. When this set up occurs, appropriate bits would be stored in the RAM. If the bit at address "100" X in the column labeled DA2 is found to be on, the appropriate bit in holding register 54 is set to an ON state. The other requirement for the match condition is fed from the appropriate holding register position to the appropriate "AND" circuit and the output indicates that an address in the adapter matches the one received from the ring in the destination address field of the frame. As can be seen from this example, any 12 bit address presented to the RAM could yield the same result; that is, the DA2 bit could be on. Therefore, any DA address within the 4K region could provide the match qualification. This is what is considered address indexing. It should be noted that by using the CAM and the external RAM, the address range available in the adapter is greatly increased. It should also be noted that the microprocessor, via setting appropriate bits in one of its control register, allows the system user the ability to turn on none, any or all of the external options (i.e., Index RAM, Cam) used in the ARF.

Figure 11:
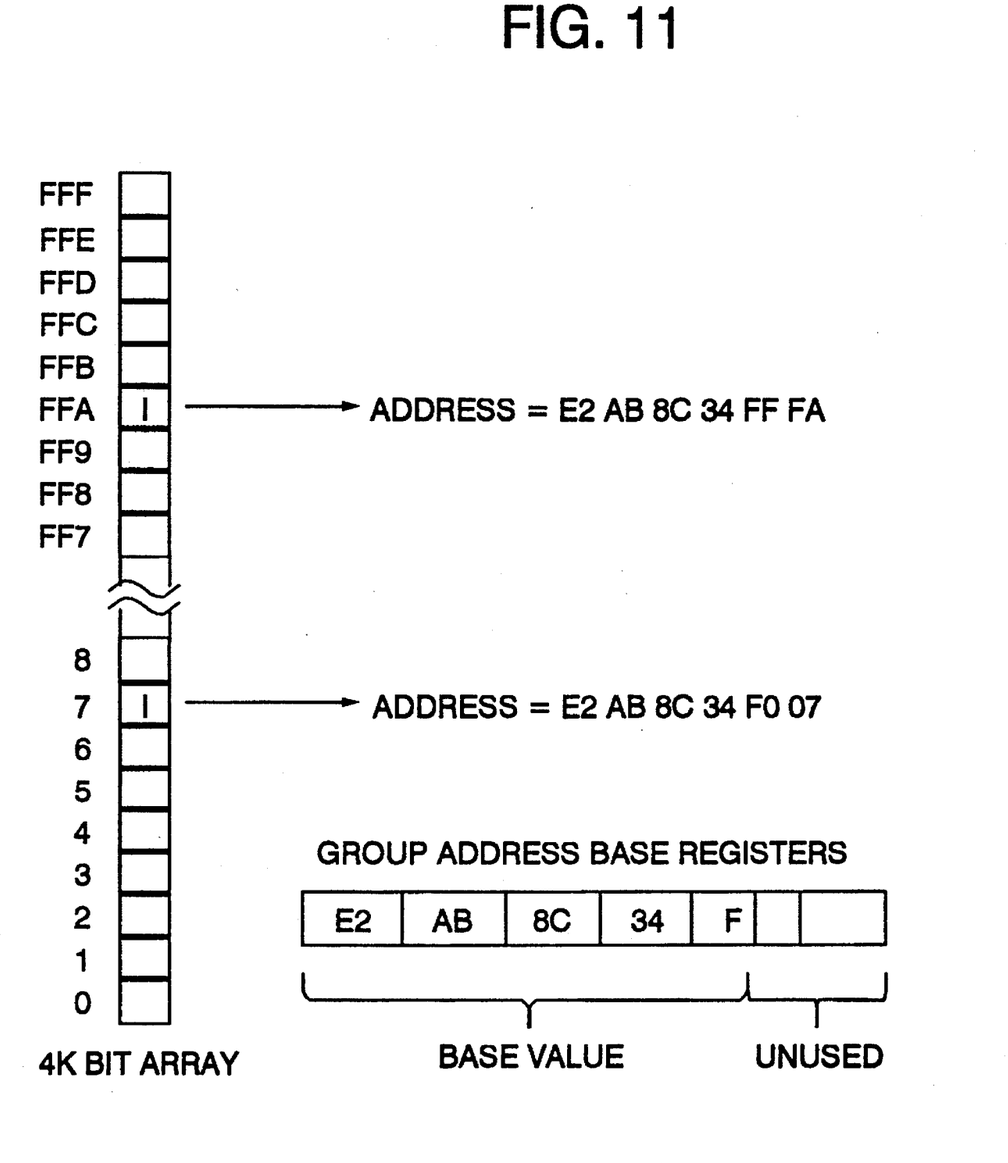
FIG. 11 shows an element of the Indexed RAM.

FIG. 11 shows a section of the index RAM with addresses and appropriate bit settings. This table is helpful in understanding the structure of the index RAM. Each element in the index RAM is made up of one base register and an associated array of bits. Each bit in the array represents an individual address. In order to calculate the group address value corresponding to an individual bit, the bit offset (labeled "UNUSED") is added to the base register value (labeled "BASE VALUE"). The size of the bit arrays and the number of the base registers vary but for a preferred design six base registers were used with 4K bit arrays. While the index RAM structure provides access to a large number of addresses, these addresses must share the same group base value. This must be taken into account when assigning addresses for an index RAM. Another important term to be used herein after is the base value. A base group as used in this application, means all group addresses associated with a single base register. In a preferred design, the base group was selected from one to 4096 group addresses.

In operation, an address in the destination field of the frame is fed into control register 52 (FIG. 5). In the preferred embodiment of the invention, the address is 48 bits (0–47). The first 36 bits (0–35) are compared with 36 bit addresses stored in DA register 0-5. If a match occurs, a signal indicating the match is outputted on one of the compare lines from the compare logic circuit means 50 (FIG. 5). The other 12 bits of the address are fed over bus 38 to address the index RAM 42. If the bit at the corresponding index RAM address is set to a first value (say, a logical 1), the output is fed into the corresponding bit position in holding reg. 54. (FIG. 5). The contents of the appropriate register position is fed into the other leg of the appropriate AND gate and, if both legs of the AND gate are on, the output from the AND gate is in an up state indicating a match.

So far, the hardware feature of the ARF has been described. The software component which is executed on the microprocessor will now be described.

In order to maximize the utilization of the address recognition function device, the microprocessor device accepts an address range value outputted on system bus 44 (FIG. 3) by the system which the adapter attaches to the LAN. The microprocessor then uses the address range value to set appropriate values in the base register and for rearranging (i.e., adjusting the contents of the index RAM and the CAM) so that a maximum number of addresses can be stored. Stated another way, the microprocessor arranges the address stored in the RAM so that an optimum number of addresses can be stored in the adapter. For purposes of discussion, two methods are used by the system to present group address to the adapter. One method is the individual group address which are passed one at a time to the adapter. The other method is a sequential group address which are represented as an individual group address followed by a number of sequential addresses. For example, if the CAM or RAM Base Address Table (to be discussed hereinafter) shows an entry GA=X'E2AB8C340004"/NUM=2. This would represent the addresses X'E2AB8C340004' and X'E2AB8C340005'.

Figure 6:
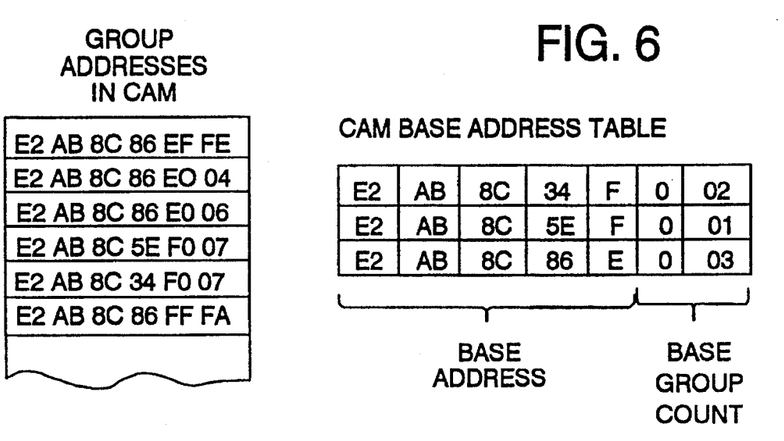
FIG. 6 is a graphical representation of the information stored in the CAM and its related CAM base address table. The representation is helpful in understanding the technique used to enter and update addresses in the CAM.

FIG. 6 shows a graphical representation of group addresses stored in the CAM and the associated CAM base address table. It should be noted that the CAM base address table is a map of addresses stored in the CAM. The base address section of the table identifies the base group address stored in the CAM and the base group count indicates the number of times a particular base group address is found in the CAM. Preferably, the CAM base address table is maintained or located in the microprocessor device. Of course, the table could be located elsewhere without departing from the scope of the present invention. With reference to FIG. 6, the base address Hexadecimal E2AB8C34F is associated with two addresses. Stated another way X'E2AB8C34F" is found at two addresses in the CAM. Similarly, the second base entry is associated with one address and the third base address is associated with three addresses. Stated another way, the CAM base address table indicates the base addresses that are in the CAM and the number of addresses associated with each base. Thus, the CAM base address table can be visualized as a map of the CAM.

Figure 7:
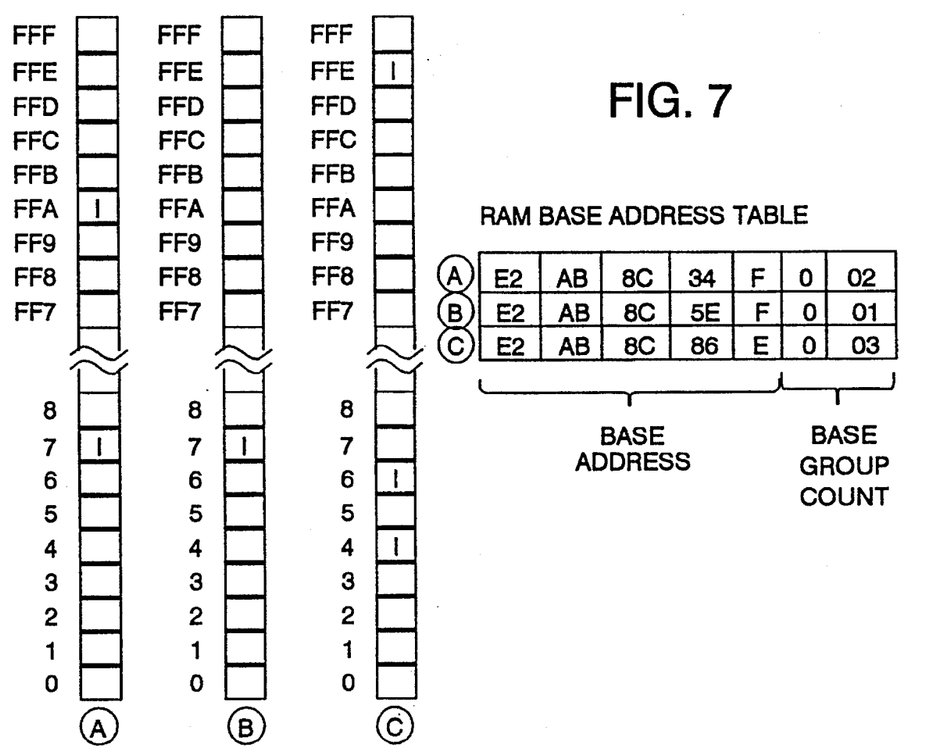
FIG. 7 shows graphical representations of the Index RAM and associated index RAM base address table. The representation is helpful in understanding the technique used to enter and update addresses in the Index RAM.

FIG. 7 is a graphical representation of the index RAM and its associated RAM base address table. As with the CAM, the RAM base address table includes a base address section representing base addresses in the RAM. The base group count indicates the number of addresses associated with the selected base. By way of example, A indicates two addresses associated with that base. B indicates one address associated with that base and C indicates three addresses associated with that base.

By monitoring the group address which is outputted on the system bus and executing a program (details of which are given hereinafter), the microprocessor is able to load the base registers, the index RAM and the CAM with appropriate values and rearrange, i.e., update the values whenever a new group address is outputted on the system bus. By implementing the improved address recognition device of the present invention, the system microprocessor only has to issue an address group which it wishes the adapter to monitor without interfering in the adapter arrangement and/ or processing of the address group. This frees up the system processor to perform additional functions and, as a result, makes the adapter much more efficient for high speed processing.

In order to understand the routine used to load and/or update the contents of the CAM and/or RAM, a few new terms are introduced and defined. The term "new base group" as used in this specification refers to the entire base group in which the new addresses belong. If the CAM contains addresses that are a part of the new base group, then they are logically removed from the CAM and considered as if they were new as well. As stated previously, the new base group is provided by the system unit to the adapter. The removal is necessary in order to make optimization calculations.

Figure 8:
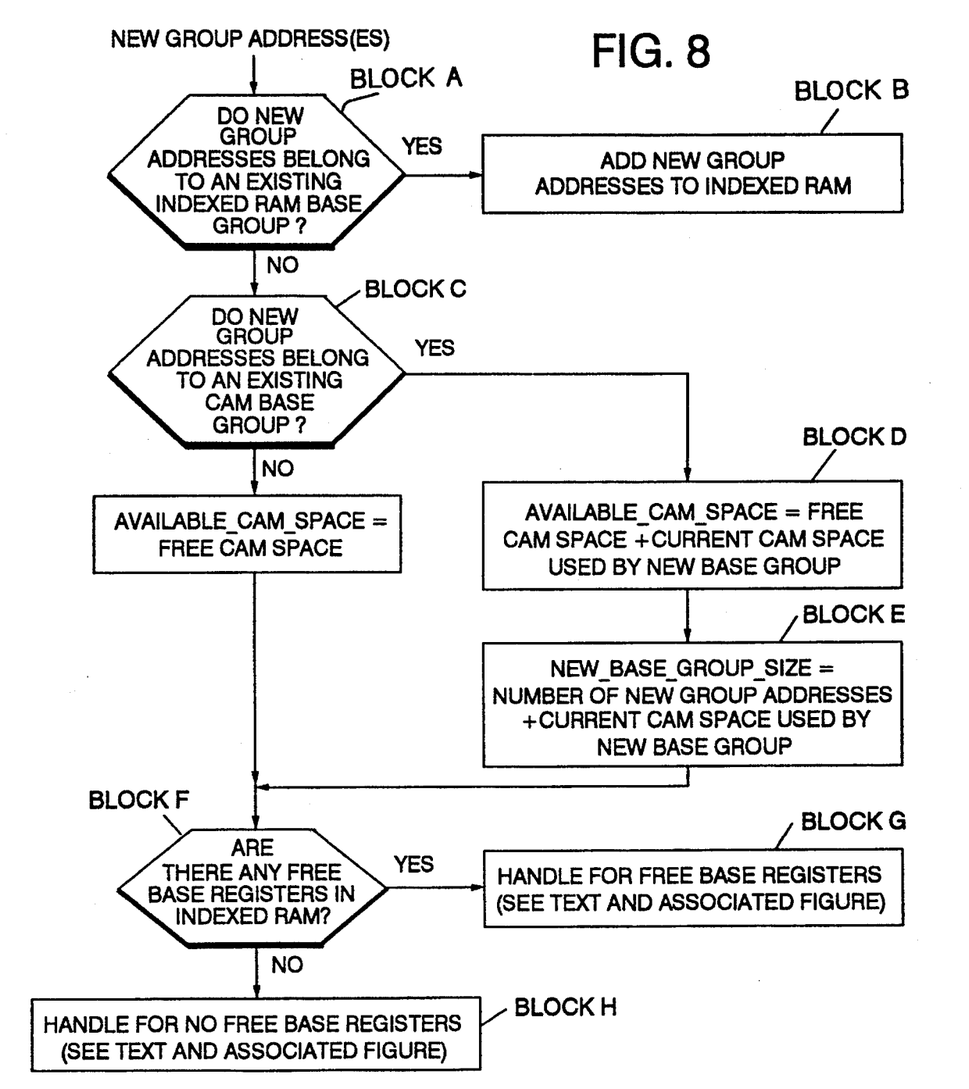
FIGS. 8, 9 and 10 are flow charts of programs executed in the control processor to enable the updating and the storing of a maximum number of group addresses in the adapter.

Turning to FIG. 8, the first portion of the optimization program or algorithm is shown. This portion of the algorithm sets up the new base group, given that the new group addresses will not fit into an existing indexed RAM based group (block A). It should be noted that the new group addresses are provided from the attached device on its system bus. If the new group addresses belong to an existing index RAM base group, the new group addresses are added to the index RAM (block B). If the new group addresses do not fit into the existing index RAM base group, the program descends into block C, where a test determining if the group address belongs to an existing CAM based group is performed. If it does, the program via block D and block E determines how much available CAM space remains and the new base group size. It should be noted that the calculation in blocks D and E logically separate any new base group addresses from the CAM. The algorithm then takes two general directions depending upon whether or not the base registers in the index RAM is full (block F). If the index RAM base registers are not full, the program descends into block G whose subroutine is set forth in FIG. 9. If there are no free registers in the index RAM, the program descends into block H whose subroutine is set forth in FIG. 10.

Figure 9:
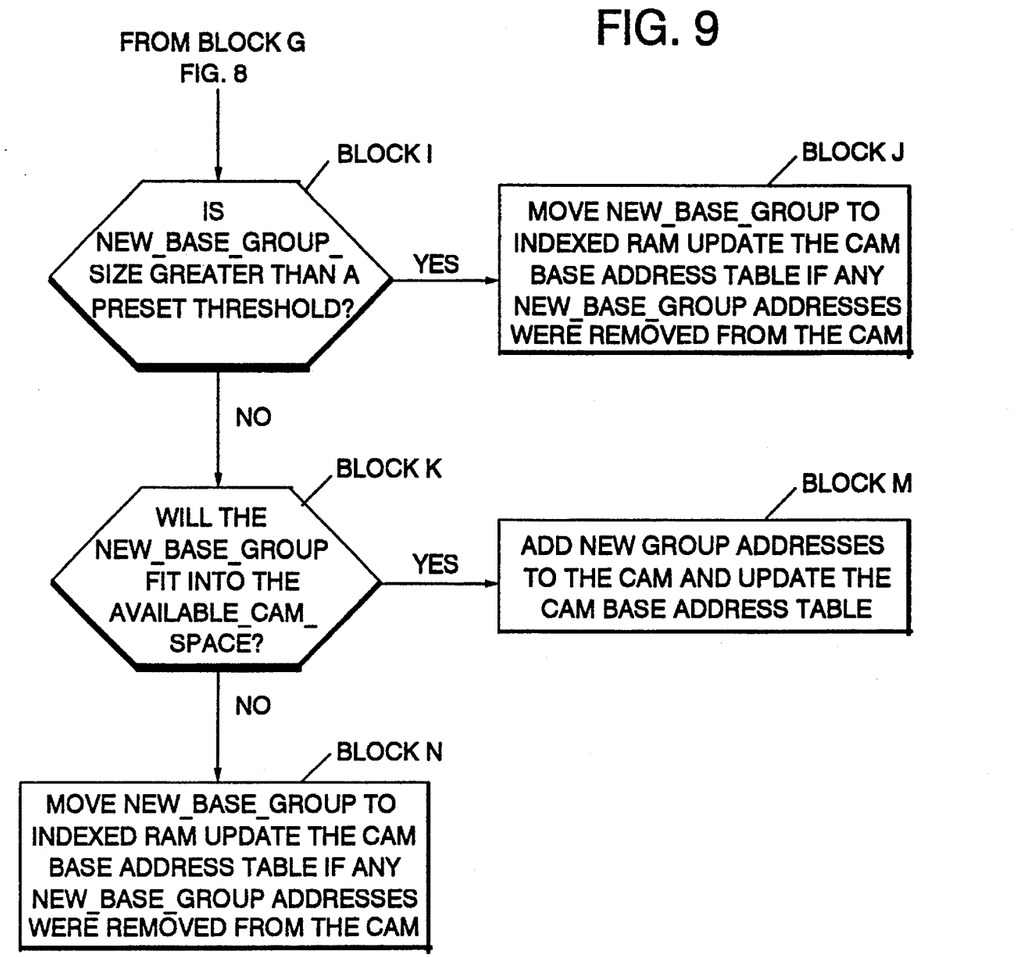

FIG. 9 shows the routine which the microprocessor executes when there are free base registers in the index RAM. In order to prevent small base groups (i.e., base groups with low base group count) from being added to the index RAM, a threshold value is set. The threshold value indicates the minimum number of occurrences of a base address before it will be entered in the RAM. Stated another way, base addresses whose occurrence is less than the threshold are stored in the CAM while base address values greater than the threshold are stored in the RAM. Still referring to FIG. 9, the first step in the program is to check if the new base group size is less than the present threshold. In the preferred embodiment of this invention, the threshold was set to seven. If the new base group size is greater than the present threshold, the new base group is moved to the index RAM. The CAM base address table is then updated if any new base group addresses were removed from the CAM (block J). If the new base group size is less than the present threshold, the program descends into block K where it tests if the new base group fits into available CAM space. The available CAM space is calculated in FIG. 8. It is the amount of free CAM space (expected to be kept track of as additions/removals are made) plus the CAM space made available by the logical removal of those addresses associated with the new base group (if any).

The available CAM space may be compared to the new base group size to determine answer to "if the new group fits into available CAM space". If the new group will fit into the available CAM space, it is added to the CAM and the CAM base address table is updated (block M). If the new base group cannot fit into the available CAM space, the program descends into block N and performs the functions set forth therein.

Figure 10:
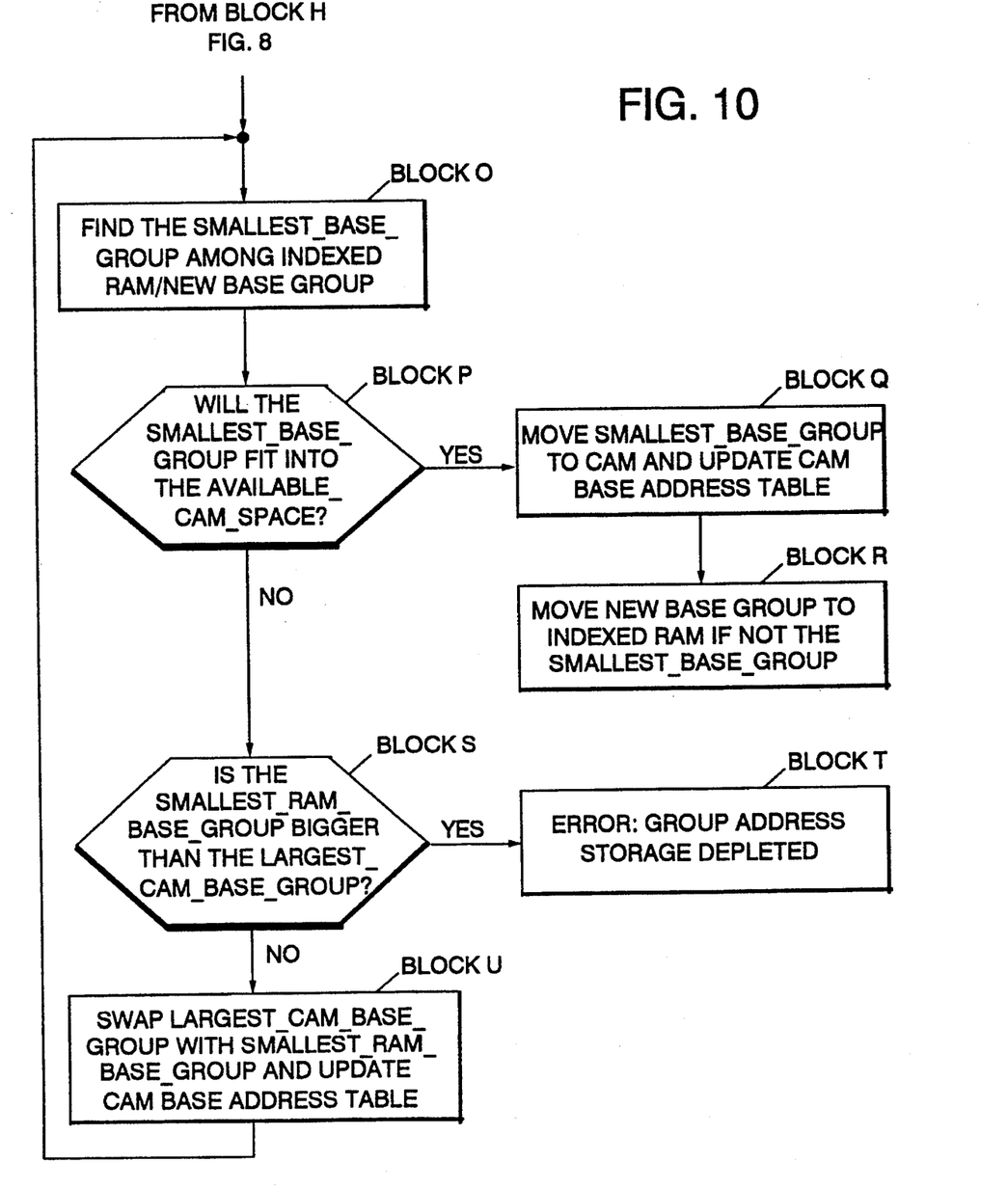

If the index RAM base registers are full (block H, FIG. 8), the microprocessor executes the subroutine set forth in FIG. 10. The logic of the subroutine shows that the algorithm can take one of two directions, depending on whether or not the smallest base group will fit into the CAM. To determine the smallest base group, the index RAM bases and the new base group are considered. Once determined, the course of action depends on the following:

a) Smallest base group fits into CAM: place smallest base group into CAM. If the smallest base group was not the new base group, then place the new base group into the index RAM.

b) Smallest base group does not fit into CAM: prior to these steps, we have determined that the CAM is full and all the index RAM base registers are in use. Now, we attempt to make room for the new base group by swapping the base groups between the CAM and the index RAM. If the CAM contains a base group that is larger than the smallest index RAM base group, then these can be swapped in order to free up room in the CAM. The cycle is then repeated until enough space is free in the CAM for the smallest base group. If the required amount of space cannot be freed, an error is reported. In order to eliminate unnecessary work in the adapter, it may be desirable to determine through calculation whether group address storage has been depleted before carrying out the RAM/CAM swaps necessary for creating extra space in the CAM.

Even though the CAM base address table gives us the ability to perform group address storage optimization, it could potentially get very large. As an example, consider a CAM with 256×48-bit entries. This would require, in the worst case, 1536 bytes (256×6). Such a "small" table may seem insignificant until one considers that the next generation token ring adapter will contain only 2K×RAM. In order to reduce the table size, we make use of the CAM addresses. Currently, a table entry consisting of a group base address, followed by the number of addresses associated with that base address. If, instead of storing the base address, one stores the CAM address of any address from this base group, then the CAM location could be read to determine the base address. This reduces our table to a manageable 512 bytes. Preferably, each table entry is 2 bytes, 1 byte for the CAM address and 1 byte for the count.

In particular and with reference to FIG. 10 in block 0, the smallest base group among index RAM/new base group is determined. The program then descends into block P where it determines if the smallest base group fits into the available CAM space. If it does, the program enters block Q where it moves the smallest base group to the CAM and updates the CAM base address table. The program then descends into block R where the new base group is moved to the index RAM if not the smallest base group. Returning to block P, if the smallest base group does not fit in the available CAM space, the program descends into block S where it determines if the smallest RAM base group is bigger than the largest CAM base group. If it is, the program enters block T and flags an error condition, meaning there is no group address storage on the adapter to accommodate the new base group. If the smallest base RAM group is not bigger than the largest CAM base group (block S), the program descends into block U where it swaps the Largest CAM base group with the smallest RAM base group and updates the CAM base address table. The program then branches back to block 0.

While the invention has been particularly shown and described with reference to the preferred embodiments thereof, it will be understood by those skilled in the art that various changes in form and detail may be made therein without departing from the spirit and scope of the invention.

What is claimed is:

1. A device for attaching data terminal equipment (DTE) to a communications network comprising:

a ring attachment module (30) for connecting to the communications network;

a protocol handler means (32) for formatting data to conform with protocol or architecture requirements of the communications network, coupled to the ring attachment module (30);

an address recognition means (32, 36) coupled to said protocol handler means, said address recognition means including a third means (36) for receiving addresses from the communications network, for separating each of the addresses into a base portion and an index portion, storage means for storing a set of addresses, logic circuit means (50) for comparing the base portion with the set of addresses and for outputting a compare signal set to a first level if the base portion matches one address in the set of addresses;

Index RAM means 42 operatively coupled to the third means, said index RAM means including a plurality of storage locations with each storage location uniquely addressable and said third means using said index portion to select one of the storage locations which outputs a second signal if the one of the storage locations is preset to a predetermined state;

a fourth means, responsive to the compare signal and the second signal to output an address match signal indicating one of the addresses received from the communications network matches an address stored in the device; and a system attach module 34, coupled to the protocol handler, for connecting to an I/O channel of the data terminal equipment.

2. The device of claim 1 wherein the third means includes a programmed microprocessor.

3. The device of claim 2 further including a Contents Address Memory (CAM) operatively coupled to the programmed microprocessor.

4. The device of claim 1 wherein the third means includes a programmed microprocessor.

5. The device of claim 1, wherein the forth means includes at least one "AND" circuit.

6. In a communications network having a transmission media and a plurality of stations coupled to said transmission media an Address Recognition Device ARD for using in each station comprising:

a programmed microprocessor for receiving an address from the transmission media and for separating said address into a base portion and an index portion;

a comparator means, operatively coupled to said programmed microprocessor, for comparing the base portion with a set of base addresses stored in said ARD and to output a first control signal if the base portion matches an address in the set of base addresses;

an index RAM module operatively coupled to the programmed microprocessor; said index RAM module having a plurality of independently addressable storage locations some of which store bits set to a first state by the microprocessor and said microprocessor using the index portion to address the index RAM module and said index RAM module outputting a second control signal if the index portion identifies a location in said index RAM module which is set to the first state; and means responsive to the first control signal and the second control signal for generating a third signal representative of a match between the address received from the transmission media and one of a plurality of addresses stored in the station.

7. The address recognition device of claim 6 further including a Contents Addressable Memory CAM for storing a plurality of addresses operatively coupled to said programmed microprocessor.

8. The address recognition device of claim 7 wherein the programmed microprocessor further includes a control register for storing control bits which enable the CAM to compare its contents with the address received from the transmission media and for enabling the ARD to perform the ARD function of address recognition or to enable either the CAM or the ARD to perform its respective function.

9. The address recognition device of claim 7 wherein the programmed microprocessor further includes a control register for receiving group address information from a DTE in said station and said programmed microprocessor using the group address information to load appropriate addresses in the Index RAM module or CAM and using the group addressable information for rearranging addresses in the Index RAM module and the CAM.

10. The address recognition device of claim 6 wherein the third means includes at least one AND circuit.

11. The Address Recognition Device of claim 6 wherein the first stage includes a logical "1".

12. A method for recognizing group addresses in a LAN having a communications media to which a plurality of stations are connected comprising the steps of:

(a) providing in each station at least one register for storing a base address in the group addresses;

(b) providing in each station an Index RAM with a plurality of independently addressable locations and selected ones of said independently addressable locations containing a status bits set to one of two states;

(c) receiving from said communication media an address;

(d) separating the address into a base portion and an index portion;

(e) comparing the base portion of the address with the base address in the at least one register and outputting a first signal if a match is found to exist;

(f) using the index portion as an address to access the Index RAM and generating a second signal if one of the status bits at an accessed location is set to a predetermined state; and (g) combining the first signal and the second signal to generate a signal representing a match between the address in step (c) and one of a plurality of addresses stored in said stations.

13. The method of claim 12 further including the step of providing in each station a Contents Addressable Memory CAM for storing addresses to be compared with the group address received from the communications media.

14. The method in claim 13 further including the steps of receiving a base group address from a Data Terminal Equipment DTE located in each station; and using the base group address for loading the RAM and Contents Addressable Memory CAM or for rearranging addresses in the RAM and CAM.

15. A device for attaching Data Terminal Equipment to a communications network comprising:

first means for connecting to the communications network;

a protocol handler means for formatting data to conform with protocol or architecture requirements of the communications network, coupled to the first means, said protocol handler means including an address recognition device having a second means for receiving addresses from the communications network, a third means for separating each one of the addresses into a base portion and an index portion, a fourth means for comparing said base portion with a set of addresses stored in said device and for generating a first logical signal set to a first signal level if said base portion matches one of the set of addresses and said third means using the index portion to address a location in a RAM whereat a state of a bit at the location generates a second logical signal set to a second signal level and a fifth means responsive to the first logical signal and the second logical signal for indicating a match between a received address and an address stored in said device if said first logical signal and said second logical signal are set to a common signal level; and a second means coupled to the protocol handler and the address recognition device; said second means for coupling to an 16. An Address Recognition Device ARD for use in a Data Terminal Equipment DTE to recognize addresses received in the DTE from a communications network to which the DTE is connected, said ARD comprising:

- a plurality of registers for storing a set of addresses;
- an Index RAM having a plurality of storage locations with each storage location being addressable and selected ones of the storage locations being set to an active state;
- a logic compare circuit arrangement (50) having a plurality of inputs, connected to the plurality of registers, and a plurality of outputs;
- a plurality of logical AND gates, with each one having a first input connected to one of the plurality of outputs, a second input coupled to selected output lines of said Index RAM and an output;
- a controller, coupled to the Index RAM and the logic compare circuit arrangement, for receiving the addresses from said communications network for separating each of the addresses into a base portion and an index portion wherein said controller uses the index portion to address a location in the Index RAM and said location causes a signal to be placed on the second input of one of the AND gates if a bit at the addressed location is set to an active state;
- said logic compare circuit arrangement compares the base portion and the set of addresses and to output a signal on one of the plurality of outputs if the base portion matches one of the set of addresses; and
- one of said plurality of logical AND gates outputting on one of the plurality of outputs a signal for indicating an address match if signals on the second input and the first input of said one of said plurality of logical AND gates are set to active logical state.

* * * * *